(12) United States Patent
McIntosh

(10) Patent No.: US 8,061,955 B2
(45) Date of Patent: Nov. 22, 2011

(54) WASTE CONTAINER CARRIER

(76) Inventor: Donald McIntosh, Long Sault (CA)

( * ) Notice: Subject to any disclaimer, the term of this patent is extended or adjusted under 35 U.S.C. 154(b) by 731 days.

(21) Appl. No.: 11/983,435

(22) Filed: Nov. 9, 2007

(65) Prior Publication Data

US 2009/0121536 A1 May 14, 2009

(51) Int. Cl.
*B60P 1/00* (2006.01)
(52) U.S. Cl. .................................................. 414/546
(58) Field of Classification Search .......... 414/541, 414/491, 482, 546, 498, 522
See application file for complete search history.

(56) References Cited

U.S. PATENT DOCUMENTS

| | | | | |
|---|---|---|---|---|
| 2,156,438 | A * | 5/1939 | Suverkrup | 414/491 |
| 3,521,780 | A * | 7/1970 | Cook | 414/632 |
| 4,778,327 | A | 10/1988 | Tufenkian | |
| 4,943,203 | A * | 7/1990 | Bohata | 414/486 |
| 6,152,674 | A * | 11/2000 | Ogrodnick | 414/498 |
| 6,234,741 | B1 * | 5/2001 | McDaniel | 414/546 |
| 6,406,247 | B1 * | 6/2002 | Ghiretti et al. | 414/498 |
| 6,457,931 | B1 * | 10/2002 | Chapman | 414/491 |
| 6,705,823 | B2 * | 3/2004 | Bohata | 414/546 |
| 6,749,389 | B1 * | 6/2004 | Vlaanderen | 414/491 |
| 7,232,189 | B2 * | 6/2007 | Covington et al. | 298/1 B |
| 7,278,816 | B2 * | 10/2007 | Marmur et al. | 414/491 |
| 7,726,930 | B2 * | 6/2010 | Simpson et al. | 414/491 |
| 2007/0237617 | A1 * | 10/2007 | Schroeder | 414/491 |

* cited by examiner

*Primary Examiner* — Joshua Rudawitz

(57) ABSTRACT

A container carrier having a support frame pivotally connected at its bottom end to a truck chassis and a carrying frame pivotally connected at its top to the top of the support frame. The carrying frame has support arms for holding a container. The support frame is generally upright with the carrying frame folded adjacent the support frame when the carrier is in a container carrying position on the truck chassis, the center of gravity of a carried container located forwardly of the rear wheels of the truck. The support frame extends rearwardly with the carrying frame unfolded when the carrier is in a container pick-up position. In the pick-up position, the support arms on the carrying frame are located past the rear end of the truck chassis and extend rearwardly therefrom to engage a container on the ground. Moving means move the support and carrying frames between the carrying position and the pick-up position.

4 Claims, 4 Drawing Sheets

WASTE CONTAINER CARRIER

BACKGROUND OF THE INVENTION

1. Technical Field

This invention is directed toward a waste container carrier.

2. Background Art

The waste container carrier of the present invention is of the type mountable on the chassis of a truck and having the carrier movable between a container pick-up position off the rear of the chassis of the truck and a container carrying position on the chassis of the truck. The container is usually a refuse or waste holding container that is placed on the ground at a location where it can be filled with refuse or waste, and when full, a truck is dispatched to pick it up and transport to a location where it can be unloaded and then returned to its previous location.

The known container carriers usually locate the container rearwardly of the rear wheels of the truck, in the carrying position, in order to be able to easily pick up and drop off the container. Such a carrying position however makes the truck unstable during operation. In order to make the truck more stable during operation, it is known to move the container forwardly on the chassis of the truck once it has been lifted up during loading so that the container is located between the front and rear wheels of the truck. An example of such a carrier is shown in U.S. Pat. No. 4,778,327. However this carrier is relatively expensive since the chassis of the truck must be extensively modified to accommodate a track used to move the container forwardly of the rear wheels on the chassis.

SUMMARY OF THE INVENTION

It is the purpose of the present invention to provide a carrier which can locate the center of gravity of the container forwardly of the rear wheels of a truck when transporting the container in order to have the truck more stable during operation. It is another purpose of the present invention to provide a carrier that is simple in construction and easy to operate.

The carrier of the present invention, in one embodiment, has a support frame and a carrying frame. The support frame is adapted to be pivotably connected to a truck chassis forwardly of the rear wheels of the truck and the carrying frame is pivotably connected to the support frame. The carrying frame has projecting arms for holding a container. The support frame is generally upright, when the carrier is in a container carrying position on the truck, the carrying frame folded against the support frame and the arms projecting rearwardly.

The support and carrying frames are positioned in the carrying position to carry a container with its center of gravity forwardly of the rear wheels of the truck. Preferably, both frames are shaped to ensure that the container is carried with its center of gravity well forwardly of the rear wheels. To unload the container off the truck, the support and carrying frames can be moved by moving means to a pick-up position where the support frame is generally horizontal and extends rearwardly past the end of the truck chassis and to have the carrying frame unfold from the support frame to form a rearward extension of the support frame and to place the container on the ground.

The carrier is simply and easily mounted on a standard truck chassis with little modification of the chassis required to accommodate the carrier. The moving means required to move the carrier between the container carrying position where the support frame is in an upright position on the truck chassis, and the carrying frame is folded against the support frame, and a container pick-up position where the support frame extends past the rear end of the truck chassis, and the carrying frame is unfolded rearwardly of the support frame, are simple fluid actuators. The carrier itself is very simple in construction having only two moving parts excluding the moving means.

In a preferred embodiment, the carrier can have a bottom frame to which the support frame and the moving means are connected. The carrier is mounted indirectly on the chassis of a truck via the bottom frame.

The invention is particularly directed toward a container carrier having a, support frame and a carrying frame. First pivot means pivotally connect the support frame to a truck chassis and second pivot means pivotally connect the carrying frame to the support frame, the carrying frame having projecting arms for holding a container. The support frame is generally upright with the carrying frame folded adjacent the support frame when the carrier is in a container carrying position on the truck chassis. The support frame extends rearwardly with the carrying frame unfolded and forming a rearward extension of the support frame when the carrier is in a container pick-up position, the projecting arms located past the rear end of the truck chassis and extending rearwardly therefrom to engage a container on the ground when the carrier is in the pick-up position. Moving means move the support and carrying frames between the carrying position and the pick-up position.

The invention is also particularly directed toward a container carrier having a support frame, the support frame having a top end and a bottom end. First pivot means pivotally connect the support frame at its bottom end on a truck chassis is forwardly of the rear wheels of the truck. The carrier has a carrying frame, the carrying frame having a top and a bottom. Second pivot means pivotally connect the top of the carrying frame to the top end of the support frame. First moving means are connected at one end to the support frame, intermediate its ends, the other end adapted to be connected to the truck chassis forwardly of the bottom end of the support frame. The first moving means are capable of swinging the support frame about the first pivot means between an upright container carrying position and a rearwardly extending container pick-up position. Second moving means are connected between the support frame, intermediate its ends, and the carrying frame intermediate its top and bottom. The second moving means are capable of moving the carrying frame about the second pivot means between a folded position adjacent the support frame and an unfolded position extending rearwardly of the support frame when the support frame is in the pick-up position.

DETAILED DESCRIPTION OF THE INVENTION

Figure 1:
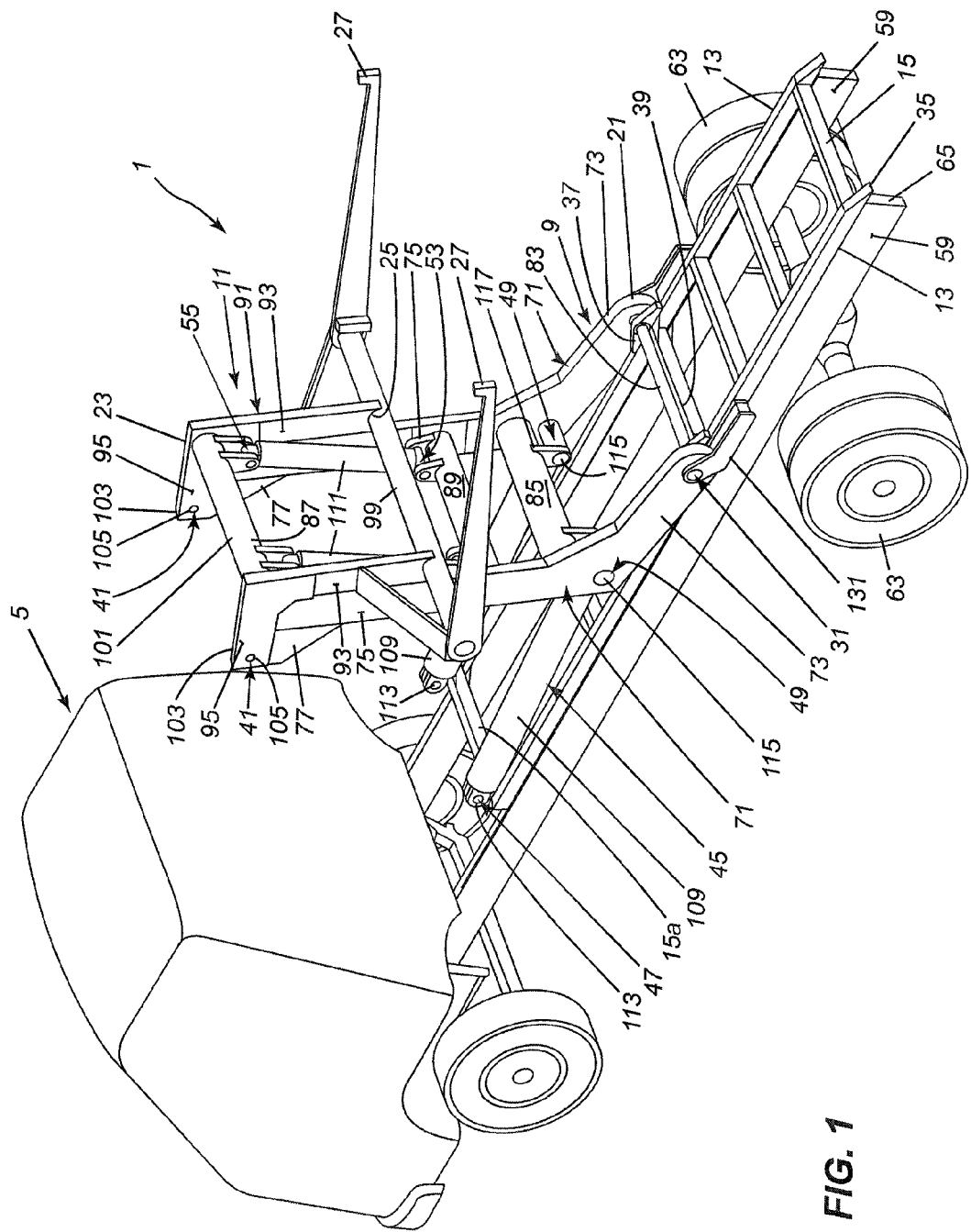
FIG. 1 is a perspective view of the container carrier mounted on a truck with the carrier in a container carrying position.
Figure 2:
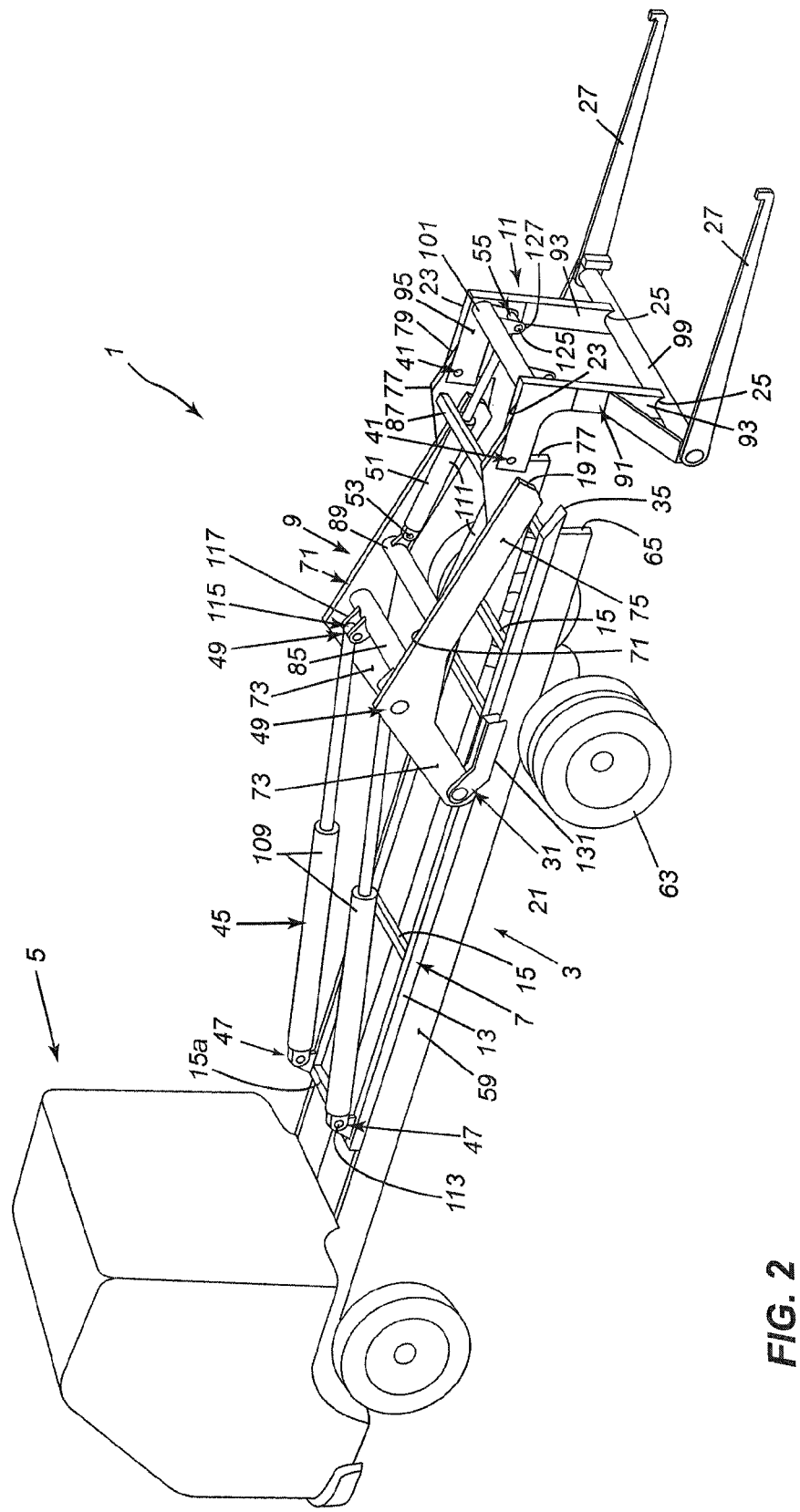
FIG. 2 is a perspective view similar to FIG. 1 but with the carrier in a container pick-up position.
Figure 3:
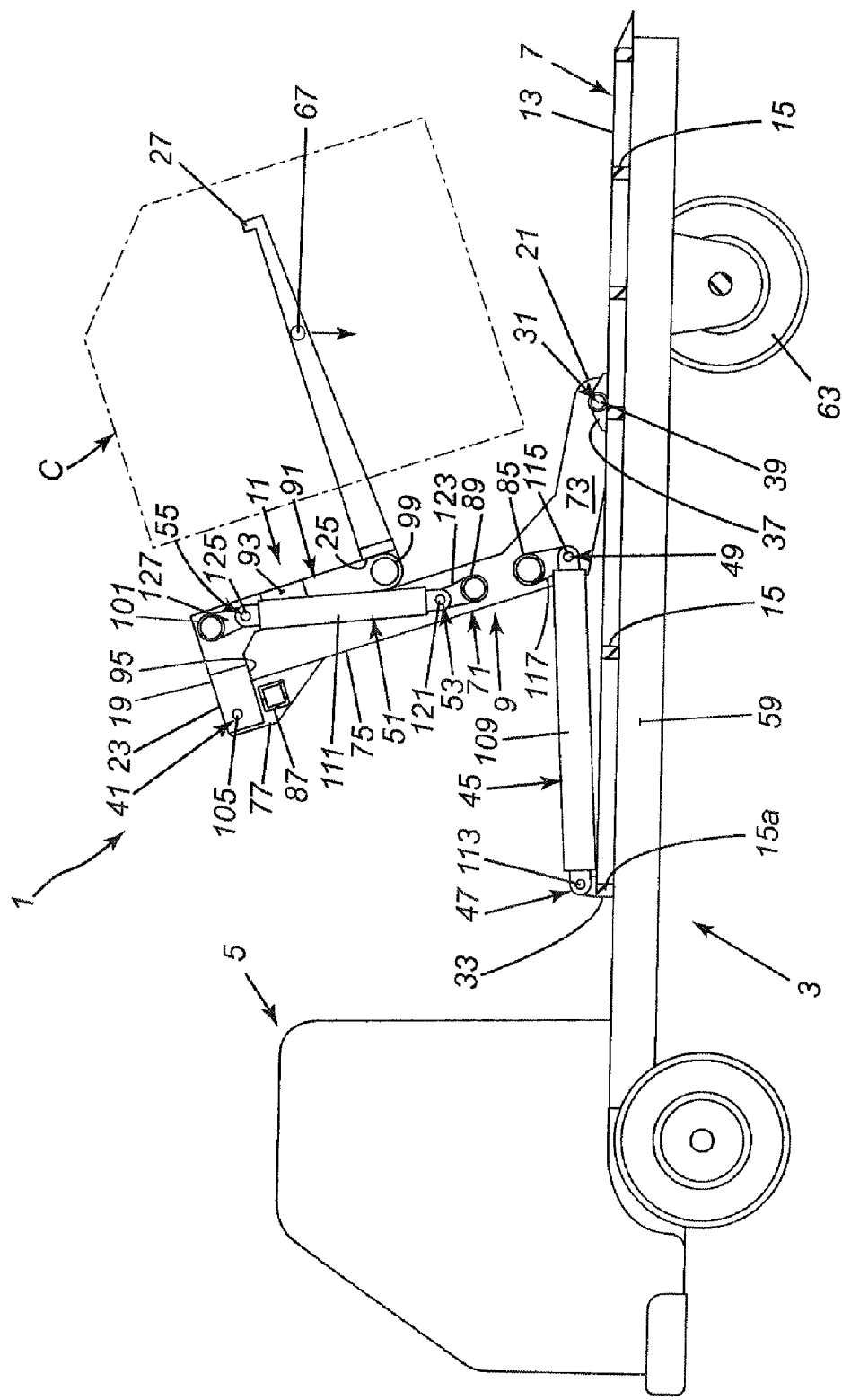
FIG. 3 is a longitudinal cross-sectional view of the container carrier on a truck with the carrier in the container carrying position.

The carrier 1 of the present invention, as shown in FIGS. 1 to 4, is adapted to be mounted on the chassis 3 of a truck 5, or like vehicle. The carrier 1 will be described as it looks when it is in a container carrying position on the truck 5 as shown in FIGS. 1 and 3. The carrier 1 has a horizontal bottom frame 7, a support frame 9 pivotally mounted on the bottom frame 7 and a carrying frame 11 that is pivotally mounted on the support frame 9. The bottom frame 7 has two parallel side beams 13 joined by cross-bars 15.

The support frame 9 is generally upright on the bottom frame 7 and the carrying frame 11 is folded onto the back of the top portion of the support frame 9. The support frame 9 has a top end 19 and a bottom end 21 with the bottom end 21 located rearwardly of the top end 19 as seen in FIG. 3. The carrying frame 11 is shorter than the support frame 9 and has a top 23 and a bottom 25 with the bottom 25 located rearwardly of the top 23 as seen in FIG. 3. A pair of container support arms 27 extend rearwardly from the bottom 25 of the carrying frame 11.

The bottom end 21 of the support frame 9 is adapted to be pivotally connected to the bottom frame 7 by a first pivot connection 31. The pivot connection 31 is intermediate the ends 33, 35 of the bottom frame 7 and slightly closer to the rear end 35 than the front end 33. The pivot connection 31 comprises a flange 37 on each side beam 13 of the bottom frame 7 and a tube 39 extending through the flanges 37 and the bottom end 21 of the support frame 9. The support frame 9 pivots about the tube 39. The top 23 of the carrying frame 11 is adapted to be pivotally connected to the top end 19 of the support frame 9, by a second pivot connection 41, with the carrying frame 11 folded against the support frame 9.

The carrier 1 includes first moving means 45 which extend between the front end 33 of the bottom frame 7 and the support frame 9. The first moving means 45 are pivotally connected at one end to the bottom frame 7 by a pivot connection 47. The first moving means 45 are pivotally connected at their other end by a pivot connection 49 to the support frame 9 intermediate its top and bottom ends 19, 21. The pivot connection 49 is closer to the bottom end 21 than to the top end 19 of the support frame 9.

The carrier 1 has second moving means 51 which are pivotally connected between the support frame 9 and the carrying frame 11. One end of the second moving means 51 are connected by a pivot connection 53 to the support frame 9, the pivot connection 53 located above the pivot connection 49 on the support frame 9. A pivot connection 55 connects the other end of the second moving means 51 to the carrying frame 11, the pivot connection 55 located intermediate the top and bottom 23, 25 of the carrying frame 11 but closer to the top 23.

The carrier 1 is adapted to be connected on the top of chassis 3 of the truck 5. The side beams 13 in the bottom frame 7 of the carrier 1 are spaced apart a distance equal to the spacing between the main beams 59 in the truck chassis 3. The carrier side beams 13 are placed on top of the chassis side beams 59 and welded or otherwise connected thereto. The carrier 1 is mounted on the chassis 3 in a position to have the pivot connection 31 forward of the rear wheels 63 of the truck.

Figure 4:
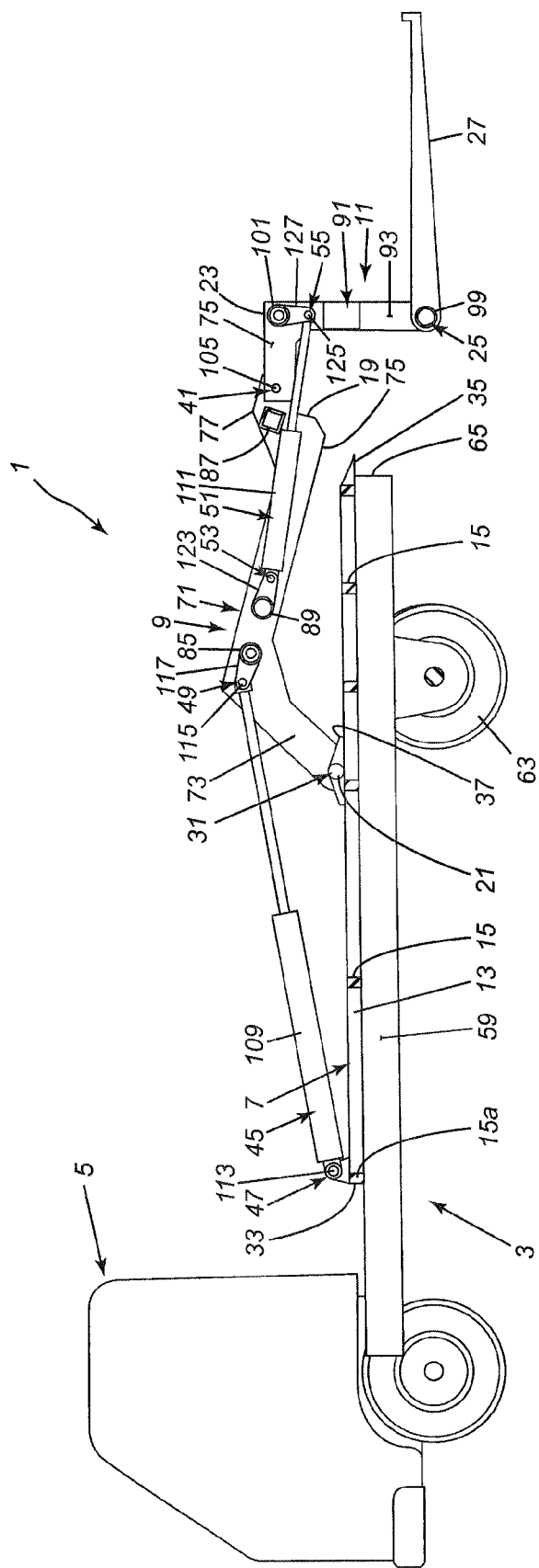
FIG. 4 is a longitudinal cross-sectional view similar to FIG. 3 but with the carrier in a container pick-up position.

With the carrier 1 mounted on the truck 5 and the truck 5 in position to pick up a container, the carrier 1 is moved from its carrying position, as shown in FIGS. 1 and 3, into a container pick-up position, as shown in FIGS. 2 and 4, by extending the first and second moving means 45, 51. As the first moving means 45 extends, it pivots the support frame 9, and the carrying frame 11 carried by it, rearwardly about the first pivot connection 31 to a generally horizontal position where it projects just past the rear end 35 of the bottom frame 7 and the rear end 65 of the truck chassis 3. As the support frame 9 moves rearwardly, the second moving means 51 pivots the carrying frame 11 about the second pivot connection 41 to unfold it from the support frame 9 and to have it extend rearwardly from the support frame 9 forming an extension to it. In this position, the support arms 27 on the carrying frame 11 used to pick up a container extend rearwardly. Retraction of the first and second moving means 45, 51 swings the support frame 9 upwardly and forwardly over the rear wheels 63 while the carrying frame 11 folds against the support frame 9 to move to the carrying position. In the carrying position, the support and carrying frames 9, 11 hold the container C, shown in dotted lines in FIG. 2, in a position to have its center of gravity 67 just forward of the rear wheels 63. In this position of the container, the truck is stable in operation.

The support and carrying frames 9, 11 can take many forms. As shown in the drawings, the preferred support frame 9 has a pair of parallel side arms 71. The arms 71 are bent to extend forwardly from the pivot 31 when the support frame is in the carrying position, the arms 71 having a short bottom section 73 and a longer top section 75. The angle between the sections 73, 75 is about 110° but can vary between 95° and 125°. In the carrying position, the bottom section 73 can rest close to the bottom frame 7 thereby locating the top section 75, carrying the container, more forwardly. The angle is preferably such that the top section 75 slants slightly forwardly to move the container even more forwardly. The bent support frame 9 also helps to lower the carrying frame 11 closer to the container in the pick-up position.

The pivot connection 41 connecting the carrying frame 11 to the support frame 9 can be made in the top of the top sections 75 of the side arms 71. Preferably however, a flange 77 extends forwardly from the top of each top section 75 and the pivot connection 41 is made adjacent the outer, upper corner 79 of the flange 77. The arrangement allows the carrying frame 11 to abut the support frame 9 in the carrying position, thus locating the container more forwardly, while still providing a relatively long moment arm for use in unfolding the carrying frame 11 from the support frame 9. The arrangement also allows the carrying frame 9 to locate the support arms 27 below the truck chassis in the pick-up position while still allowing the carrying frame 11 to fold adjacent to the support frame 9 in the carrying position.

The bent side arms 71 of the support frame 9 are connected by the pivot tube 39 at their bottom ends; by a tubular cross member 85 intermediate the ends of the arms 71, preferably near the bottom of the top section 75 of the arms; and by a tubular cross member 87 extending between the flanges 77 at the top end of the support frame. Another tubular cross member 89 can extend between the arms 71 just above the intermediate tubular member 85. The resulting structure is quite solid, but more cross members could be used if needed to strengthen the support frame 9. While the side arms 71 are shown bent in an angular manner, they could also be bent in a curved manner.

The carrying frame 11 has two parallel side arms 91 which are bent to extend rearwardly from the pivot connection 41 when in the carrying position as shown in FIG. 3. The side arms 91 have a relatively long bottom section 93 and a relatively short top section 95. The top section 95 extends transversely from the bottom section 93. However the angle between the top and bottom sections 95, 93 can vary between 70° and 110°. A bottom cross member 99 joins the bottom ends of the arms 91 at the bottom 25 of the frame 11. A top cross member 101, at the junction of the top and bottom sections 95, 93, also joins the arms 91. The bottom cross member 99 extends past the side arms 91 and carries the support arms 27 at its ends. The support arms 27 are spaced apart a distance generally equal to the width of the container they are to pick up.

The free ends of the top sections 95 of the side arms 91 of the carrying frame 11 are preferably slotted as shown at 103 and receive a portion of the flanges 77. Pivot pins 105, forming the pivot connection 41, extend through the free ends of the top sections 95 and the flanges 77 to pivotally connect the arms 91 to the flanges.

The moving means 45, 51 each preferably comprise two fluid cylinders 109, 111 respectively. The fluid cylinders 109 are each connected at their front end by a pivot pin 113 to flanges (not shown) on the front cross bar 15a of the bottom frame 7. The pivot pins 113 form part of the pivot connection 47. The other end of the fluid cylinders 109 are each connected by a pivot pin 115 to a bracket 117 extending down from the intermediate cross-bar 85 in the support frame 9. The pivot pins 115 form the pivot means 49. The fluid cylinders 111 are each connected at one end to the cross member 89 in the support frame 9. A pivot pin 121 connects the end of the cylinders to brackets 123 on the cross member 89, the pivot pins 121 forming the pivot means 53. The other end of the cylinders 111 are connected by pivot pins 125 to brackets 127 extending down from the cross member 101 on the carrying frame 11. The pivot pins 125 form the pivot means 55. The fluid cylinders are preferably hydraulic cylinders and are connected by lines to a hydraulic system carried by the vehicle. Other arrangements of moving means can be used, such as a single cylinder, instead of two, at each location.

The pivot tube 39 at the bottom end of the support frame 9 extends through the flanges 37 on the bottom frame 7 and through the bottom ends of the bottom section 73 of the side arms 71 to pivotally connect the support frame 9, at its bottom end 21 to the bottom frame 7. The side arms 71 are located just outside the side beams 13 of the bottom frame 7. A support member 131 can be fastened to the outer side of the side beams 13 for supporting the ends of the pivot tube 39 passing through the bottom sections 73 of the side arms 71.

While the carrier 1 has been described as having a bottom frame 7, the carrier can be used without a bottom frame if desired. Without the bottom frame, the flanges 37 would be connected directly to the top of the chassis beams 59 of a vehicle. In addition, the flanges connecting the first moving means 45 to the bottom frame would instead be mounted directly on a cross beam (not shown) inserted between the chassis beams 59, the flanges positioned on the cross beam adjacent the inner side of the chassis beams 59. The connection of the flanges 37 to the chassis beams 59 must be forwardly of the rear wheels 63 of the vehicle. Installation of the carrier without a bottom frame is still simple and little modification is needed to the truck chassis.

The invention claimed is:

1. A self-loading and unloading container carrier for mounting on a vehicle, the carrier having an elongate support frame with a top end and a bottom end, first pivot means for connecting the bottom end of the support frame to a vehicle chassis, first moving means connected between the vehicle chassis, in front of the first pivot means, and the support frame, above the first pivot means, for normally maintaining the support frame generally upright on the chassis in a container carrying position; the support frame having flange means extending forwardly and upwardly from the top end; a generally inverted L-shaped, carrying frame, the carrying frame having a top section and a bottom section extending down from one end of the top section, second pivot means connecting the other end of the top section to the flange means on the support frame with the top section resting on the top end of the support frame and the bottom section against the rear of the support frame in the container carrying position; second moving means pivotably connected between the carrying frame and the support frame, above the connection of the first moving means to the support frame; and a pair of laterally spaced-apart support arms extending rearwardly from the bottom section of the carrying frame, the support arms adapted to hold a container between the arms and provide sole support for the container in all positions; the first and second moving means operable to move the support frame and the carrying frame from the container carrying position to a container pickup position where the support frame is pivoted about the first pivot means to extend rearwardly from the first pivot means, and the carrying frame is pivoted about the second pivot means to have its top section generally aligned with the support frame, with the support arms extending rearwardly to be able to engage a container for pickup, the first and second moving means operable to move the support frame and the carrying frame back to their carrying position with the container being carried by the support arms and held above the vehicle chassis.

2. A container carrier as claimed in claim 1 wherein the support frame is bent to have a short bottom section and a long top section, the bottom section of the support frame generally parallel to the vehicle chassis and the top section of the support frame extending upwardly from the front end of the bottom section in the container carrying position, the rear end of the bottom section froming part of the first pivot connection.

3. A container carrier as claimed in claim 2 wherein the top section of the support frame slopes slightly forwardly from the bottom section of the support frame.

4. A self-loading and unloading container carrier for mounting on a vehicle, the carrier including a bottom frame adapted to be attached to the vehicle chassis, the carrier having an elongate support frame with a top end and a bottom end, first pivot means for connecting the bottom end of the support frame to the bottom frame, first moving means connected between the bottom frame, in front of the first pivot means, and the support frame, above the first pivot means, for normally maintaining the support frame generally upright on the chassis bottom frame in a container carrying position; the support frame having flange means extending forwardly and upwardly from the top end; a generally inverted L-shaped, carrying frame, the carrying frame having a top section and a bottom section extending down from one end of the top section, second pivot means connecting the other end of the top section to the flange means on the support frame with the top section resting on the top end of the support frame and the bottom section against the rear of the support frame in the container carrying position; second moving means pivotably connected between the carrying frame and the support frame, above the connection of the first moving means to the support frame; and a pair of laterally spaced-apart support arms extending rearwardly from the bottom section of the carrying frame, the support arms adapted to hold a container between the arms and provide sole support for the container in all positions; the first and second moving means operable to move the support frame and the carrying frame from the container carrying position to a container pickup position where the support frame is pivoted about the first pivot means to extend rearwardly from the first pivot means, and the carrying frame is pivoted about the second pivot means to have its top section generally aligned with the support frame, with the support arms extending rearwardly to be able to engage a container for pickup, the first and second moving means operable to move the support frame and the carrying frame back to their carrying position with the container being carried by the support arms and held above the bottom frame.

* * * * *